(12) United States Patent
Angel

(10) Patent No.: US 10,388,174 B2
(45) Date of Patent: Aug. 20, 2019

(54) WRITING INSTRUMENT TEACHING SYSTEM

(71) Applicant: Oswaldo Angel, Los Angeles, CA (US)

(72) Inventor: Oswaldo Angel, Los Angeles, CA (US)

( * ) Notice: Subject to any disclaimer, the term of this patent is extended or adjusted under 35 U.S.C. 154(b) by 935 days.

(21) Appl. No.: 14/172,762

(22) Filed: Feb. 4, 2014

(65) Prior Publication Data

US 2015/0221226 A1  Aug. 6, 2015

(51) Int. Cl.
*G09B 23/00* (2006.01)
*G09B 23/02* (2006.01)
*G09B 1/32* (2006.01)
*B43K 7/00* (2006.01)
*B43K 8/00* (2006.01)
*B43K 19/00* (2006.01)
*B43K 29/02* (2006.01)
*B43K 29/08* (2006.01)

(52) U.S. Cl.
CPC ............... *G09B 1/32* (2013.01); *B43K 7/005* (2013.01); *B43K 8/003* (2013.01); *B43K 19/00* (2013.01); *B43K 29/02* (2013.01); *B43K 29/08* (2013.01); *G09B 23/00* (2013.01); *G09B 23/02* (2013.01)

(58) Field of Classification Search
USPC ....................................................... 434/391
See application file for complete search history.

(56) References Cited

U.S. PATENT DOCUMENTS

| | | | |
|---|---|---|---|
| 613,432 A | 11/1898 | Szenhak | |
| 1,068,367 A | 7/1913 | Roeder | |
| 1,720,499 A | 7/1929 | Walker | |
| 2,158,431 A | 5/1939 | Sanders | |
| 2,262,818 A | 11/1941 | Reese | |
| 2,646,220 A | 7/1953 | Weiser | |
| 2,693,910 A | 11/1954 | Oleson | |
| 2,777,636 A | 1/1957 | Weiser | |
| 3,880,349 A | 4/1975 | Harte | |
| 5,007,840 A | 4/1991 | Gaskell | |
| 7,033,102 B2 | 4/2006 | Bhavnani | |
| 2005/0079002 A1 | 4/2005 | Hazzard | |

FOREIGN PATENT DOCUMENTS

| | | | |
|---|---|---|---|
| CN | 2061900 | | 9/1990 |
| CN | 201116044 Y | * | 9/2008 |

OTHER PUBLICATIONS http://www.amazon.com/MUSGRAVE-PENCIL-CO-INC-MULTIPLICATION/dp/B0041L1U8K/ref=sr_1_1?ie=UTF8&qid=1391561460&sr=8-1&keywords=pencil+multiplication+table.

* cited by examiner

*Primary Examiner* — James B Hull
(74) *Attorney, Agent, or Firm* — Trojan Law Offices

(57) ABSTRACT

A writing instrument comprises an elongated barrel having a first end, a second end and a plurality of sides including at least three sides, each side having data printed along its length at uniform spacing increments from the first end, the data on any two sides that share the same distance from the first end are computationally related to the data on another side that shares the same distance from the first end. The data includes at least one of a numerical data or a phonic alphabet. The numerical data on a first side and a third side is linked to a sign that associated with an arrow respectively to indicate the direction to which the writing instrument should be rotated to signify the computation relation. Thus, the elongated barrel defines a triangular shaped writing instrument that allows a user to learn the computation relation between the data.

9 Claims, 7 Drawing Sheets

| X→ | | |
|---|---|---|
| 1 | 10 | 10 |
| 1 | 9 | 9 |
| 1 | 8 | 8 |
| 1 | 7 | 7 |
| 1 | 6 | 6 |
| 1 | 5 | 5 |
| 1 | 4 | 4 |
| 1 | 3 | 3 |
| 1 | 2 | 2 |
| 1 | 1 | 1 |
| | | ÷← |

FIG. 4A

| X→ | | |
|---|---|---|
| 2 | 10 | 20 |
| 2 | 9 | 18 |
| 2 | 8 | 16 |
| 2 | 7 | 14 |
| 2 | 6 | 12 |
| 2 | 5 | 10 |
| 2 | 4 | 8 |
| 2 | 3 | 6 |
| 2 | 2 | 4 |
| 2 | 1 | 2 |
| | | ÷← |

FIG. 4B

| X→ | | |
|---|---|---|
| 3 | 10 | 30 |
| 3 | 9 | 27 |
| 3 | 8 | 24 |
| 3 | 7 | 21 |
| 3 | 6 | 18 |
| 3 | 5 | 15 |
| 3 | 4 | 12 |
| 3 | 3 | 9 |
| 3 | 2 | 6 |
| 3 | 1 | 3 |
| | | ÷← |

FIG. 4C

| X→ | | |
|---|---|---|
| 4 | 10 | 40 |
| 4 | 9 | 36 |
| 4 | 8 | 32 |
| 4 | 7 | 28 |
| 4 | 6 | 24 |
| 4 | 5 | 20 |
| 4 | 4 | 16 |
| 4 | 3 | 12 |
| 4 | 2 | 8 |
| 4 | 1 | 4 |
| | | ÷← |

FIG. 4D

| X→ | | |
|---|---|---|
| 6 | 10 | 60 |
| 6 | 9 | 54 |
| 6 | 8 | 48 |
| 6 | 7 | 42 |
| 6 | 6 | 36 |
| 6 | 5 | 30 |
| 6 | 4 | 24 |
| 6 | 3 | 18 |
| 6 | 2 | 12 |
| 6 | 1 | 6 |
| | | ÷← |

FIG. 4E

| X→ | | |
|---|---|---|
| 7 | 10 | 70 |
| 7 | 9 | 63 |
| 7 | 8 | 56 |
| 7 | 7 | 49 |
| 7 | 6 | 42 |
| 7 | 5 | 35 |
| 7 | 4 | 28 |
| 7 | 3 | 21 |
| 7 | 2 | 14 |
| 7 | 1 | 7 |
| | | ÷← |

FIG. 4F

| X→ | | |
|---|---|---|
| 8 | 10 | 80 |
| 8 | 9 | 72 |
| 8 | 8 | 64 |
| 8 | 7 | 56 |
| 8 | 6 | 48 |
| 8 | 5 | 40 |
| 8 | 4 | 32 |
| 8 | 3 | 24 |
| 8 | 2 | 16 |
| 8 | 1 | 8 |
| | | ÷← |

FIG. 4G

| X→ | | |
|---|---|---|
| 9 | 10 | 90 |
| 9 | 9 | 81 |
| 9 | 8 | 72 |
| 9 | 7 | 63 |
| 9 | 6 | 54 |
| 9 | 5 | 45 |
| 9 | 4 | 36 |
| 9 | 3 | 27 |
| 9 | 2 | 18 |
| 9 | 1 | 9 |
| | | ÷← |

FIG. 4H

| X→ | | |
|---|---|---|
| 10 | 10 | 100 |
| 10 | 9 | 90 |
| 10 | 8 | 80 |
| 10 | 7 | 70 |
| 10 | 6 | 60 |
| 10 | 5 | 50 |
| 10 | 4 | 40 |
| 10 | 3 | 30 |
| 10 | 2 | 20 |
| 10 | 1 | 10 |
| | | ÷← |

FIG. 4I

| + → | | |
|---|---|---|
| 1 | 10 | 11 |
| 1 | 9 | 10 |
| 1 | 8 | 9 |
| 1 | 7 | 8 |
| 1 | 6 | 7 |
| 1 | 5 | 6 |
| 1 | 4 | 5 |
| 1 | 3 | 4 |
| 1 | 2 | 3 |
| 1 | 1 | 2 |
| | | ← |

FIG. 5A

| + → | | |
|---|---|---|
| 2 | 10 | 12 |
| 2 | 9 | 11 |
| 2 | 8 | 10 |
| 2 | 7 | 9 |
| 2 | 6 | 8 |
| 2 | 5 | 7 |
| 2 | 4 | 6 |
| 2 | 3 | 5 |
| 2 | 2 | 4 |
| 2 | 1 | 3 |
| | | ← |

FIG. 5B

| + → | | |
|---|---|---|
| 3 | 10 | 13 |
| 3 | 9 | 12 |
| 3 | 8 | 11 |
| 3 | 7 | 10 |
| 3 | 6 | 9 |
| 3 | 5 | 8 |
| 3 | 4 | 7 |
| 3 | 3 | 6 |
| 3 | 2 | 5 |
| 3 | 1 | 4 |
| | | ← |

FIG. 5C

| + → | | |
|---|---|---|
| 4 | 10 | 14 |
| 4 | 9 | 13 |
| 4 | 8 | 12 |
| 4 | 7 | 11 |
| 4 | 6 | 10 |
| 4 | 5 | 9 |
| 4 | 4 | 8 |
| 4 | 3 | 7 |
| 4 | 2 | 6 |
| 4 | 1 | 5 |
| | | ← |

FIG. 5D

| + → | | |
|---|---|---|
| 6 | 10 | 16 |
| 6 | 9 | 15 |
| 6 | 8 | 14 |
| 6 | 7 | 13 |
| 6 | 6 | 12 |
| 6 | 5 | 11 |
| 6 | 4 | 10 |
| 6 | 3 | 9 |
| 6 | 2 | 8 |
| 6 | 1 | 7 |
| | | ← |

FIG. 5E

| + → | | |
|---|---|---|
| 7 | 10 | 17 |
| 7 | 9 | 16 |
| 7 | 8 | 15 |
| 7 | 7 | 14 |
| 7 | 6 | 13 |
| 7 | 5 | 12 |
| 7 | 4 | 11 |
| 7 | 3 | 10 |
| 7 | 2 | 9 |
| 7 | 1 | 8 |
| | | ← |

FIG. 5F

| + → | | |
|---|---|---|
| 8 | 10 | 18 |
| 8 | 9 | 17 |
| 8 | 8 | 16 |
| 8 | 7 | 15 |
| 8 | 6 | 14 |
| 8 | 5 | 13 |
| 8 | 4 | 12 |
| 8 | 3 | 11 |
| 8 | 2 | 10 |
| 8 | 1 | 9 |
| | | ← |

FIG. 5G

| + → | | |
|---|---|---|
| 9 | 10 | 19 |
| 9 | 9 | 18 |
| 9 | 8 | 17 |
| 9 | 7 | 16 |
| 9 | 6 | 15 |
| 9 | 5 | 14 |
| 9 | 4 | 13 |
| 9 | 3 | 12 |
| 9 | 2 | 11 |
| 9 | 1 | 10 |
| | | ← |

FIG. 5H

| + → | | |
|---|---|---|
| 10 | 10 | 20 |
| 10 | 9 | 19 |
| 10 | 8 | 18 |
| 10 | 7 | 17 |
| 10 | 6 | 16 |
| 10 | 5 | 15 |
| 10 | 4 | 14 |
| 10 | 3 | 13 |
| 10 | 2 | 12 |
| 10 | 1 | 11 |
| | | ← |

FIG. 5I

| → | | |
|---|---|---|
| b | e | d |
| f | e | n |
| j | e | t |
| m | e | t |
| p | e | t |
| y | e | t |
| w | e | d |
| b | e | g |
| g | e | t |
| k | e | g |

FIG. 7A

| → | | |
|---|---|---|
| b | i | b |
| d | i | d |
| f | i | b |
| g | i | g |
| h | i | s |
| k | i | p |
| l | i | t |
| n | i | p |
| p | i | t |
| b | i | d |

FIG. 7B

| → | | |
|---|---|---|
| b | o | b |
| c | o | d |
| c | o | x |
| d | o | t |
| g | o | d |
| h | o | p |
| l | o | b |
| m | o | d |
| p | o | p |
| r | o | t |

FIG. 7C

| → | | |
|---|---|---|
| b | u | d |
| c | u | b |
| d | u | d |
| g | u | t |
| j | u | g |
| m | u | m |
| p | u | n |
| r | u | g |
| s | u | m |
| t | u | x |

FIG. 7D

| → | | |
|---|---|---|
| sh | a | rp |
| sh | a | rk |
| sh | a | m |
| sh | i | p |
| sh | ir | t |
| sh | or | t |
| sh | ou | t |
| sh | o | p |
| sh | u | t |
| sh | a | ck |

FIG. 7E

| → | | |
|---|---|---|
| n | e | t |
| r | e | d |
| t | e | n |
| w | e | t |
| b | e | t |
| h | e | m |
| l | e | g |
| p | e | g |
| r | e | f |
| v | e | t |

FIG. 7F

| → | | |
|---|---|---|
| d | i | g |
| f | i | g |
| g | i | n |
| h | i | t |
| k | i | t |
| m | i | d |
| n | i | t |
| r | i | b |
| b | i | g |
| d | i | m |

FIG. 7G

| → | | |
|---|---|---|
| b | o | g |
| c | o | g |
| d | o | b |
| f | o | b |
| g | o | t |
| h | o | t |
| l | o | g |
| m | o | p |
| p | o | t |
| s | o | b |

FIG. 7H

| → | | |
|---|---|---|
| b | u | g |
| c | u | d |
| d | u | g |
| h | u | b |
| j | u | t |
| n | u | n |
| p | u | p |
| r | u | m |
| s | u | n |
| y | u | m |

FIG. 7I

WRITING INSTRUMENT TEACHING SYSTEM

RELATED APPLICATIONS

Not Applicable.

BACKGROUND OF THE DISCLOSURE

Technical Field of the Disclosure

The present embodiment relates in general to writing instruments. More particularly, the present embodiment relates to a triangular writing-instrument teaching-system designed to provide a convenient, more efficient method of learning basic mathematics and learning phonetics.

Description of the Related Art

It is often a tedious job for young children to study and solve various mathematical problems. Study and memorization of multiplication and addition tables plays a vital role for students who want to excel in mathematics as multiplication, division, addition and subtraction are some of the basic operations in mathematics. Many of the students are unable to memorize and to master multiplication tables and hence have difficulty in solving problems involving multiplication tables. As a result, the students are also unable to perform mental calculations quickly and are forced to rely heavily on calculators. Such practice is known to hinder the brain development of young children and make them less efficient in making mental arithmetic calculations in real life. In recent years, various kinds of writing instruments and teaching systems have been developed that provide a simple, interesting and user-friendly approach for assisting students to learn and to master multiplication and addition tables.

Some of the conventional writing and teaching systems are pencils, pens, pencil box, workbooks, and a wide variety of both mechanical and electronic devices. But these conventional devices have considerable drawbacks. For example, such writing devices do not stimulate the learning process and fail to engage or capture the student's attention for extended periods of time. Some of the devices are in the form of toys to attract young children which can make the learning process less effective and more time consuming. Some devices are not readily adaptable for independent usage and can be difficult to handle by small children.

For example, U.S. Pat. No. 1,720,499 issued to Walker on Jul. 9, 1929 discloses an educational device for teaching multiplication or division by providing an aid to children in memorizing and acquiring a ready knowledge of the common multiplication. The multiplication and division tables are printed circumferentially along a circular surface which can prevent the user from memorizing and make it difficult to check if the answers are correct. In addition, none of these instruments contain information on the addition and subtraction of numbers. These writing instruments merely put the multiplication table on the surface of the pencil and do not disclose the idea that how each number is related to the other number with respect to position or with respect to the direction of rotation.

Another example includes U.S. Pat. No. 2,777,636 issued to Weiser on Jan. 15, 1957 that discloses a mathematical device for writing instruments that is structurally simplified to enable the answers to various problems such as addition, subtraction, multiplication, division and square root to be directly read in response to an extremely simple manipulation of the device. This device has multiplication and division results printed on the same side. Moreover, the device have crowded amount of information on each side thereby confusing the user and preventing the user from memorizing the result. In addition, the device does not provide an idea on which side the writing instruments should be rotated to get the multiplication and division results.

Similarly, Chinese Pat. No. CN2061900 issued to Lin Changfeng on Sep. 12, 1990 discloses a multiplication table exercise pen using a hollow pen sleeve and digital matrix. By the rotation of the pen sleeve, the multipliers can be seen displayed along the length of the pen. Even though, the pen provides the multiples of the number, it does not provide information on the division of numbers and prevents the user from learning the relationship of multiplication and division.

Some conventional writing instruments describe pencils that have the entire multiplication table printed on the pencils. However, the overwhelming amount of information hinders a user from comprehending the data, and the pencils would be used merely as a reference table. The entire multiplication table printed on the pencil would also make it difficult for the user to memorize the multiplication table.

Therefore, there is a need for a writing-instrument teaching-system that would provide a convenient method for learning multiplication, division, addition and subtraction. Such a needed device has a plurality of sides with numerical data printed on each side. Such a writing instrument would provide an efficient means for young children to study and memorize multiplication tables. Such a writing instrument would hide the numerical data on the other side of the instrument and help children to memorize and to check if their answers are correct. Such a needed device would illustrate the relationship between multiplication and division. Such a writing instrument would provide arrow signs to indicate the direction in which the numerical data should be combined to get the multiplication and division results. This writing instrument would also provide a simple, interesting and user-friendly approach to assist students to learn and to master the multiplication table. This device could also be used to teach addition and subtraction. Further, such a writing instrument would also provide the numbers separated by sides that would allow the user to only see one set of numbers from one single side clearly at one time. Finally, such a writing instrument would provide the appropriate amount of information to allow the user to learn multiplication and division without increased confusion due to complexity.

Such a needed device would also be designed to specifically educate the user about phonics by permitting the sounds of each word to be displayed on single side with the entire word sounded out as the pencil is rotated. All the embodiments have the advantage that as the student uses up the pencil, the student is forced to commit to memory the information located on the disappearing portions of pencil.

SUMMARY OF THE DISCLOSURE

The present invention is directed to a writing instrument that allows a user to learn the computational relation between data and a method to determine a resultant value of computation by means of using the writing instrument. In a preferred embodiment of the present invention, the writing instrument comprises an elongated barrel having a first end, a second end and a plurality of sides, each side having the data printed along its length at uniform spaced increments from the first end, the data on any two sides that share the same distance from the first end are computationally related to the data on another side that shares the same distance from the first end.

More specifically, a preferred embodiment of the writing instrument comprises an elongated barrel having a first end, a second end and three sides, each side having data printed along its length at uniform spacing increments from the first end, the data on any two sides that share the same distance from the first end are computationally related to the data on a third side that shares the same distance from the first end. The data on a first side and a third side is linked to a sign that is associated with an arrow respectively at the first end and the second end of the elongated barrel to indicate the direction to which the writing instrument should be rotated to signify the computation relationship.

One objective of the invention is to provide a writing instrument that can be used to provide a convenient, more efficient learning method for obtaining answers to a wide range of arithmetic problems.

A second objective of the invention is to provide a triangular shaped writing instrument that allows a user to learn computation relation between the data.

A third objective of the invention is to provide a writing instrument that can teach the computation relation of numerical data or teach the phonic alphabet.

Another objective of the present invention is to provide a writing instrument that teaches multiplication and division tables or addition and subtraction tables.

Another objective of the present invention is to provide a method that allows a user to determine a resultant value of a computational relationship.

Yet another objective of the present invention is to provide a writing instrument with an arrow to indicate the direction to which the writing instrument should be rotated to signify the computation relationship.

Still another objective of the present invention is to provide a method for learning pronunciation of a word by means of using the writing instrument.

These and other advantages and features of the present invention are described with specificity so as to make the present invention understandable to one of ordinary skill in the art.

BRIEF DESCRIPTION OF THE DRAWINGS

In order to enhance clarity and improve understanding of the various elements and embodiments of this disclosure, elements in the figures have not necessarily been drawn to scale. Furthermore, elements that are known to be common and well understood to those in the industry are not depicted in order to provide a clear view of the various embodiments of the disclosure, thus the drawings are generalized in form in the interest of clarity and conciseness.

FIGS. 4A through 4I illustrate exemplary multiplication and division tables for different numbers printed on the writing instrument;

FIGS. 5A through 5I illustrate exemplary addition and subtraction tables for different numbers printed on the writing instrument;

FIGS. 7A through 7I illustrate exemplary character tables for different words that can be printed on the writing instrument.

DETAILED DESCRIPTION OF THE DRAWINGS

In the following discussion addresses a number of embodiments and applications of the present disclosure, reference is made to the accompanying drawings that form a part hereof, and are shown by way of illustration of specific embodiments in which the disclosure may be practiced. It is to be understood that other embodiments may be utilized and changes may be made without departing from the scope of the present disclosure.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below. Finally, many of the steps are presented below in an order intended only as an exemplary embodiment. Unless logically required, no step should be assumed to be required earlier in the process than a later step simply because it is written first in this document.

Figures 1A, 1B, 1C:
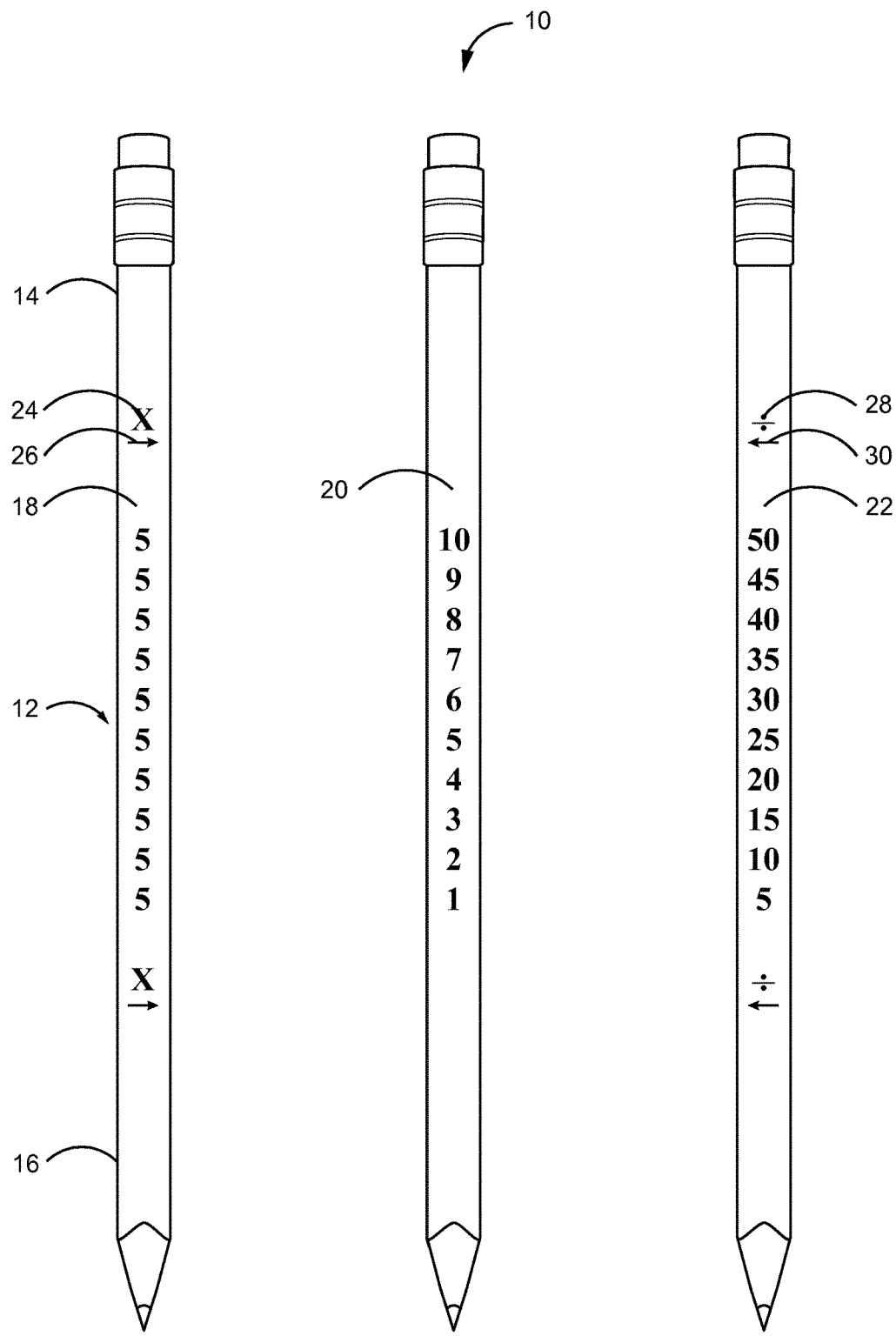
FIGS. 1A through 1C illustrates the perspective view of an exemplary embodiment of a writing instrument to determine a resultant value of multiplication and division in accordance with the present invention.

FIGS. 1A through 1C illustrate the perspective views of an exemplary embodiment of a writing instrument 10 to determine a resultant value of multiplication and division in accordance with the present invention. The present invention is designed to provide a convenient, more efficient learning method for obtaining answers to a wide range of arithmetic problems. The writing instrument 10 comprises an elongated barrel 12 having a first end 14, a second end 16 and a plurality of sides including at least three sides 18, 20, 22. The at least three sides 18, 29, 22 of the elongated barrel 12 form a triangular shaped writing instrument 10. Each side 18, 20, 22 of the writing instrument 10 includes data printed along the length of the elongated barrel 12 at uniform spaced increments from the first end 14. The data printed on the elongated barrel 12 includes at least one of number on each side or at least one phonic unit on each side, such as a letter or syllable. The numerical data on each side is related by multiplication and division or addition and subtraction. The numerical data on a first side 18 and a third side 22 is linked to a sign that is associated with an arrow respectively at the first end 14 and/or the second end 16 of the elongated barrel 12 to indicate the direction to which the numerical data should be combined to signify the computation relationship. The data on first side 18 and the second side 20 that share the same distance from the first end 14 are computationally related to the data on the third side 22 that shares the same distance from the first end 14. The numerical data on each of the sides that are mathematically related to each other is referred to as a set of numerically related data.

The triangular shaped writing instrument 10 allows the user to learn the computation relation between the data. The writing instrument 10 is selected from a group consisting of: a pencil, a lead pencil, a pen, a ballpoint pen, a marker, and a felt-tip pen. For example, as shown in FIG. 1A through FIG. 1C the numerical data includes a multiplication and division table. The multiplication and division table is associated with a multiplication sign 24 with a right arrow 26 on the first side 18 as shown in FIG. 1A at the first end 14 and the second end 16 of the elongated barrel 12 and a division sign 28 with a left arrow 30 on the third side 22 as shown in FIG. 1C at the first end 14 and the second end 16 of the elongated barrel 12. The right arrow 26 and the left arrow 30 indicate the direction in which the numerical data should be combined to signify the multiplication and division relationship respectively. The right arrow 26 indicates that the writing instrument 10 is rotated clockwise to show a multiplication relationship among the numerical data and the left arrow 30 indicates that the writing instrument 10 is rotated counterclockwise to show a division relationship among the numerical data.

In the particular, in the example shown from FIG. 1A through FIG. 1C, the number 5 is printed on the first side 18 of the elongated barrel 12 ten times between the first end 14 and the second end 16. The numbers 1 to 10 are printed on the second side 20 from the second end 16 to the first end 14. On the third side 22, the results of the first ten multiples of 5, namely, 5, 10, 15, 20 . . . 45, 50, are printed from the second end 16 to the first end 14. The numbers are printed at uniform spacing increments on the elongated barrel 12. As the writing instrument 10 is rotated clockwise, the resultant value of multiplication between the numerical data on the first side 18 and the second side 20 that share the same distance from the first end 14 is obtained from the numerical data on the third side 22 that share the same distance from the first end 14. As the writing instrument 10 is rotated counterclockwise, the resultant value of division between the numerical data on the third side 22 and the second side 20 is obtained from the first side 18. The numerical data on each of the sides that are mathematically related to each other is referred to as a set of numerically related data.

Figures 2A, 2B, 2C:
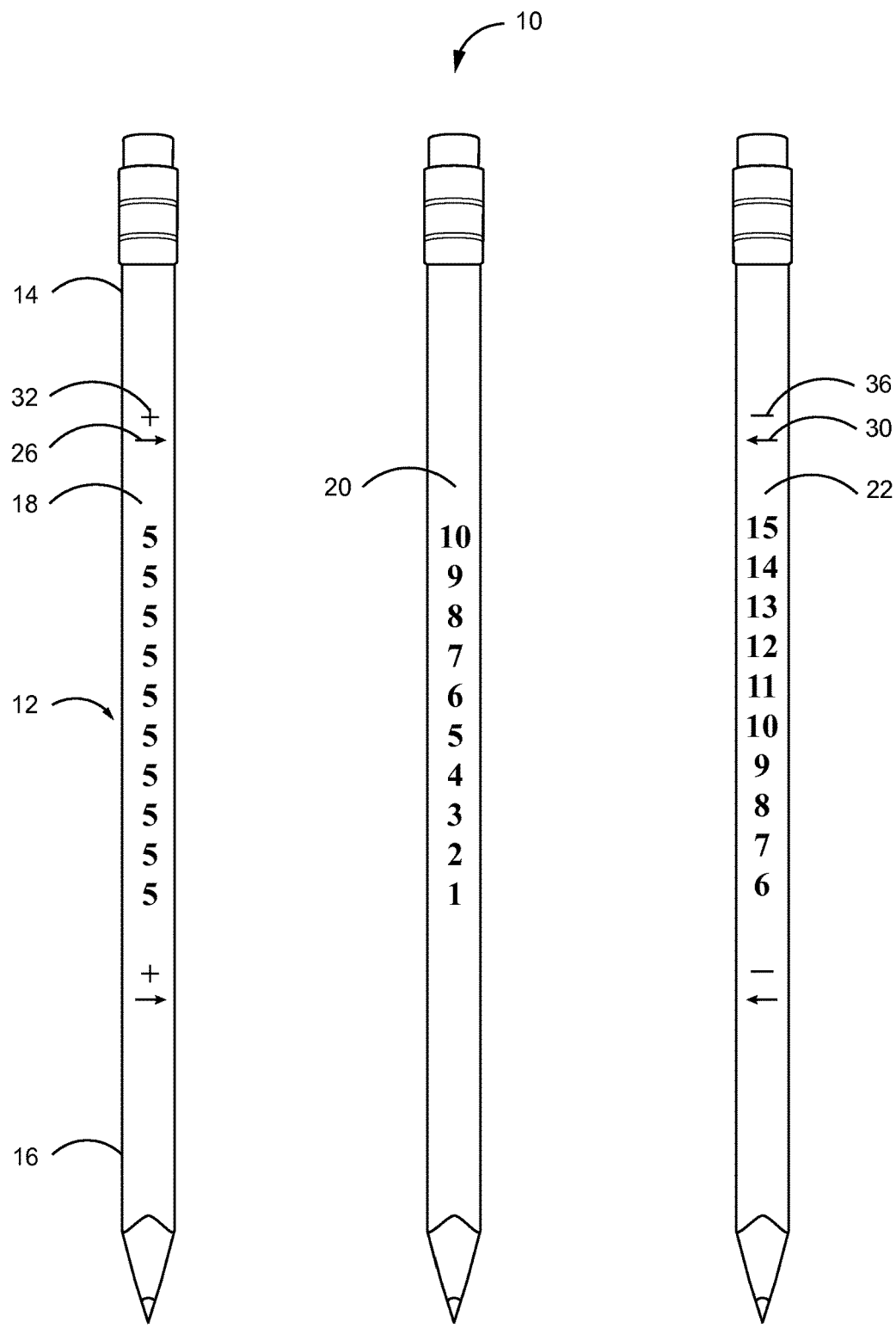
FIGS. 2A through 2C illustrates the perspective view of another exemplary embodiment of the writing instrument to determine a resultant value of addition and subtraction in accordance with the present invention.

FIGS. 2A through 2C illustrate the perspective views of another exemplary embodiment of the writing instrument 10 to determine a resultant value of addition and subtraction in accordance with the present invention. Numerical data is printed on the first side 18, the second side 20 and the third side 22 of the writing instrument 10. The first side 18 of the writing instrument 10 is associated with an addition sign 32 with a right arrow 26 as shown in FIG. 2A and the third side 22 is associated with a subtraction sign 36 with a left arrow 30 as shown in FIG. 2C. The addition sign 32 with the right arrow 26 and the subtraction sign 36 with the left arrow 30 are printed on the first end 14 and the second end 16 of the elongated barrel 12. The right arrow 26 indicates that the elongated barrel 12 should be rotated clockwise to show an addition relationship among the numerical data. The left arrow 30 indicates that the elongated barrel 12 is rotated counterclockwise to show a subtraction relationship among the numerical data. The numerical data on each of the sides that are mathematically related to each other is referred to as a set of numerically related data.

Figure 3:
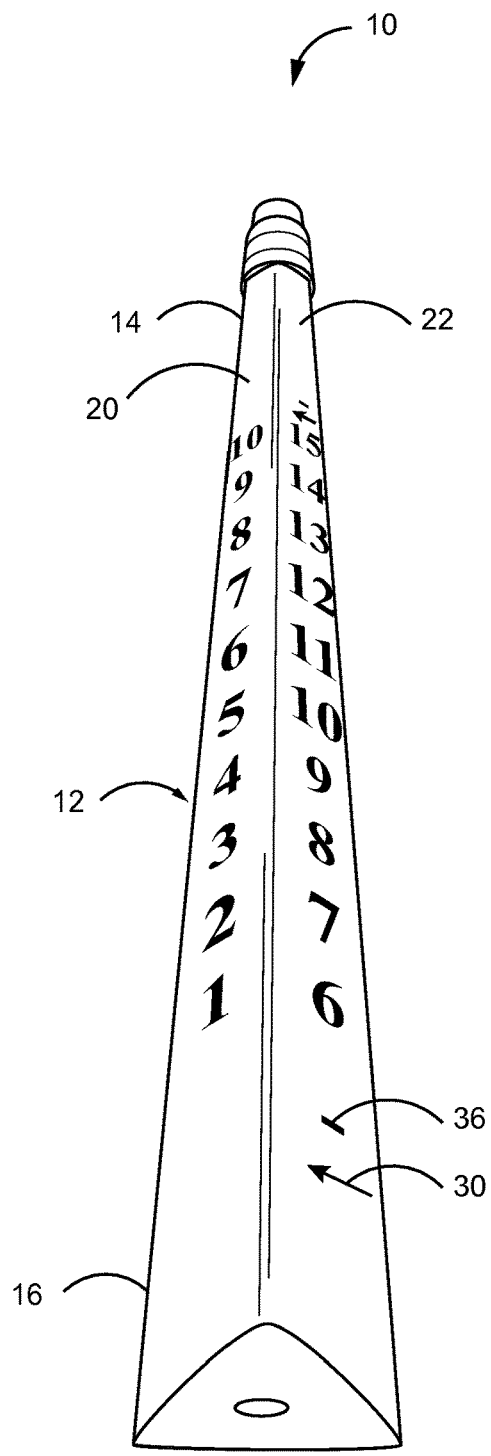
FIG. 3 is a perspective view of a writing instrument to determine a resultant value of addition and subtraction, illustrating a second side and a third side shown in FIGS. 2B and 2C.

FIG. 3 is a perspective view of the writing instrument 10 to determine a resultant value of addition and subtraction, illustrating the second side 20 and the third side 22 shown in FIGS. 2B and 2C. As the writing instrument 10 is rotated clockwise, the resultant value of addition between the numerical data on the first side 18 and the second side 20 is obtained from the third side 22. As the writing instrument 10 is rotated counterclockwise, the resultant value of subtraction between the numerical data on the third side 22 and the second side 20 is obtained from the first side 18.

Similarly, as the writing instrument 10 is rotated clockwise, the resultant value of multiplication between the numerical data on the first side 18 and the second side 20 is obtained from the numerical data on the third side 22. As the writing instrument is rotated counterclockwise, the resultant value of division between the numerical data on the third side and the second side is obtained from the first side.

FIGS. 4A through 4I illustrate the multiplication and division tables for different numbers printed on the writing instrument 10. For example, as illustrated in FIG. 4A, ten 1's are printed on the first side 18 of the writing instrument 10. On the second side 20 of the writing instrument 10, numbers 1 to 10 are printed from the second end 16 to the first end 14. On the third side 22 of the writing instrument 10, the results of the first ten multiples of 1, namely, 1, 2, 3, 4 . . . 9, 10 are printed. As the writing instrument 10 is rotated clockwise, the resultant value of multiplication between the numerical data that share the same distance from the first end 14 on the first side 18 and the second side is obtained from the numerical data on third side 22 that share the same distance from the first end 14. As the writing instrument 10 is rotated counterclockwise, the resultant value of division between the numerical data on the third side 22 and the second side 20 that share the same distance from the first end 14 is obtained from the numerical data on the first side 18 that share the same distance from the first end 14. Other embodiments as shown in FIGS. 4B through 4I contain multiples of other digits.

FIGS. 5A through 5I illustrate exemplary addition and subtraction tables for different numbers printed on the writing instrument 10. For example, as illustrated in FIG. 5A, ten 1's are printed on the first side 18 of the writing instrument 10. On the second side 20 of the writing instrument 10, numbers 1 to 10 are printed from the second end 16 to the first end 14. On the third side 22 the writing instrument 10, the result obtained by adding the numbers on the first side 18 and the second side 20, namely, 2, 3, 4, 5 . . . 10, 11 are printed. As the writing instrument 10 is rotated clockwise, the resultant value of addition between the numerical data that share the same distance from the first end 14 on the first side 18 and the second side is obtained from the numerical data on third side 22 that share the same distance from the first end 14. As the writing instrument 10 is rotated counterclockwise, the resultant value of subtraction between the numerical data on the third side 22 and the second side 20 that share the same distance from the first end 14 is obtained from the numerical data on the first side 18 that share the same distance from the first end 14. Other embodiments as shown in FIGS. 5B through 5I contain addition and subtraction tables of other digits.

Figures 6A, 6B, 6C:
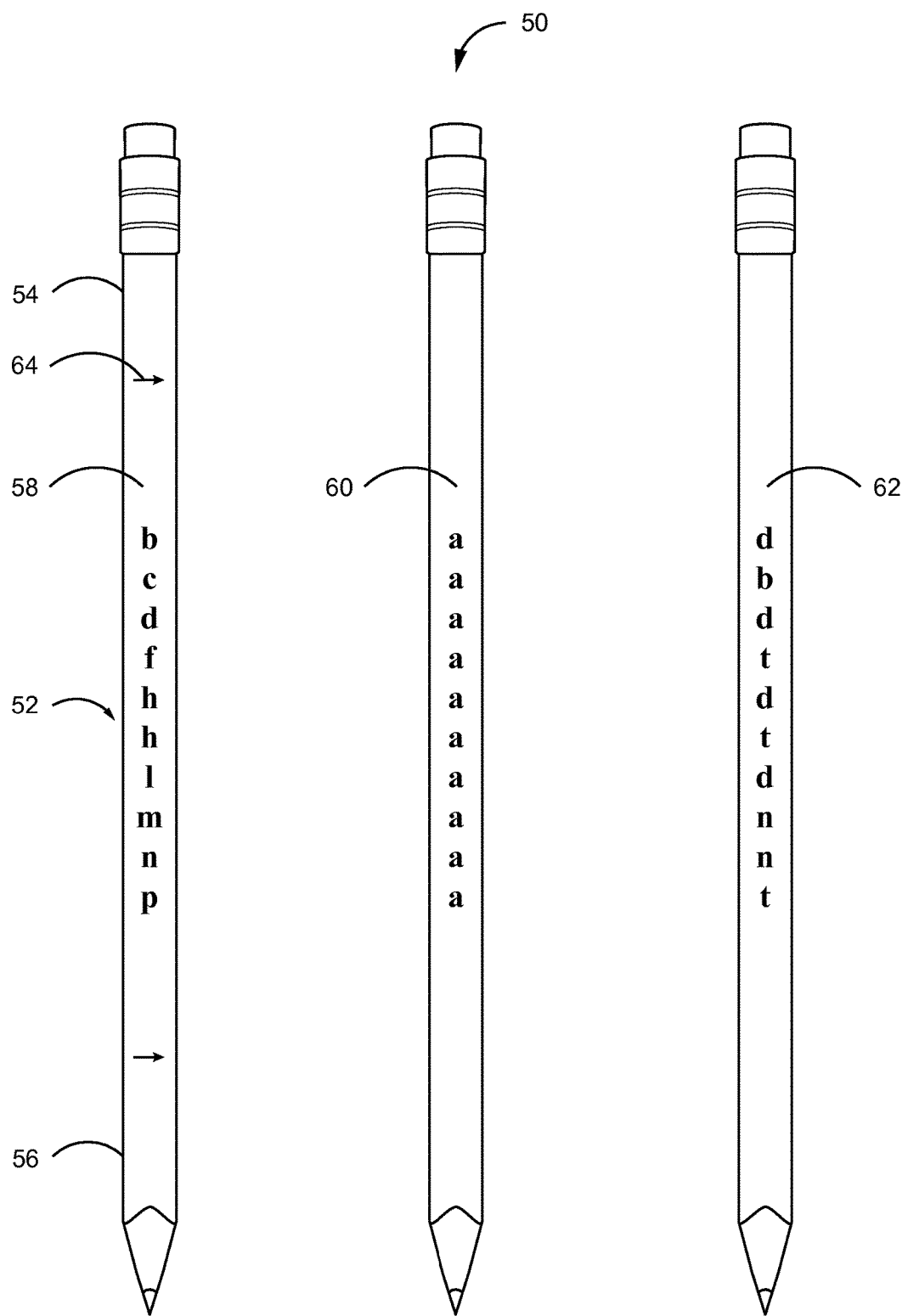
FIGS. 6A through 6C illustrate the perspective view of another exemplary embodiment of the writing instrument for learning pronunciation of a word in accordance with the present invention.

FIGS. 6A through 6C illustrates the perspective view of another exemplary embodiment of a writing instrument 50 for learning pronunciation of a word in accordance with the present invention. The writing instrument 50 for learning pronunciation of the word comprises an elongated barrel 52 having a first end 54, a second end 56 and at least three sides 58, 60 and 62 each side having data printed along its length at uniform spacing increments from the first end 54. The data printed on the first side 58, the second side 60 and the third side 62 of the elongated barrel 52 includes a phonic alphabet. The phonic alphabet can be a single alphabet letter or a common phonic group of letters. The phonic alphabet on the first side 58 and the second side 60 that share same distance from the first end 54 are related to the phonic alphabet on the third side 62 that shares the same distance from the first end 54. The phonic alphabet on the first side 58 of the elongated barrel 52 is associated with a right arrow 64 at the first end 54 and the second end 56 of the elongated barrel 52 to indicate the direction in which the phonic alphabet should be combined to learn the pronunciation of the word. The right arrow 64 as shown in FIG. 6A indicates that phonic alphabets be combined in from left to right and the writing instrument 50 should be rotated in clockwise direction to combine the phonic alphabet to learn the pronunciation of the word.

FIGS. 7A through 7I illustrate exemplary character tables for different words that can be printed on the writing instrument 50. The right arrow 64 as shown in the character tables indicates that the writing instrument 50 should be rotated in clockwise direction to combine the phonic alphabet to learn the pronunciation of the word. The writing instrument 50 allows children to sound out the pronunciation of the word by breaking the word into three separate sounds. As the writing instrument 50 is rotated in clockwise direction, the sound of each phonic alphabet is combined to learn the pronunciation of the word. For example, as illustrated in FIG. 7A, the single alphabet letter 'b', 'e' and 'd' at uniform spacing increments from the first end 54 on the first side 58, the second side 60 and the third side 62 respectively of the elongated barrel 52 forms the word 'bed' when the elongated barrel is rotated in the clockwise direction. In another example, as illustrated in FIG. 7E, a common phonic group of letters 'sh', 'a' and 'rp' at uniform spacing increments from the first end 54 on the first side 58, the second side 60 and the third side 62 respectively of the elongated barrel 52 forms the word 'sharp' when the elongated barrel is rotated in the clockwise direction.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

I claim:

1. A writing instrument comprising:
an elongated barrel having a first end, a second end and at least three sides, each side having data printed along its length at increments from the first end, each data represents a value; wherein the values of the data are related in a manner that a computation of the values of the data on any two sides that share the same distance from the first end is equal to the value of the data on another side that shares the same distance from the first end;
the elongated barrel defines a shape that permits the viewing of a single side without viewing any other side to assist in learning the computation among the data.

2. The writing instrument of claim 1 wherein the data printed on the elongated barrel includes at least one set of numerical data.

3. The writing instrument of claim 2 wherein the set of numerical data include at least one of a multiplication and division table or an addition and subtraction table.

4. The writing instrument of claim 2 wherein the numerical data on a first side and a third side is linked to a sign that associated with an arrow respectively at the first end and the second end of the elongated barrel to indicate the direction to which the numerical data should be combined to signify the computation.

5. The writing instrument of claim 1 wherein the writing instrument is selected from a group consisting of: a pencil, a lead pencil, a pen, a ballpoint pen, a marker, and a felt-tip pen.

6. A writing instrument comprising:
an elongated barrel having a first end, a second end and three sides, a first side having a first value printed at a first distance from the first end, a second side having a second value also printed at the first distance from the first end, a third side having a third value also printed at the first distance from the first end; wherein a computation of the first value and the second value is equal to the third value;
the first side further having a fourth value printed at a second distance from the first end, the second side further having a fifth value also printed at the second distance from the first end, the third side further having a sixth value also printed at the second distance from the first end, wherein the same computation of the fourth value and the fifth value is equal to the sixth value;
whereby the elongated barrel defines a triangular shaped writing instrument that allows a user to learn the computation among the values.

7. The writing instrument of claim 6 wherein a multiplication sign with an arrow on the first side and a division sign with a second arrow on the third side of the elongated barrel.

8. The writing instrument of claim 6 wherein an addition sign with an arrow on the first side and a subtraction sign with a second arrow on the third side of the elongated barrel.

9. A writing instrument comprising:
an elongated barrel having a first end, a second end and at least three sides, each side having a plurality of Arabic numerals printed along its length at uniform spacing increments from the first end; at least one side having a plurality of identical Arabic numerals; wherein particular Arabic numerals on any two sides that share the same distance from the first end are computationally related to a particular Arabic numeral on another side that shares the same distance from the first end;
the elongated barrel defines a shape that permits the viewing of a single side without viewing any other side to assist in learning the computation relation among the Arabic numerals.

* * * * *